Patented Nov. 8, 1932

1,887,452

UNITED STATES PATENT OFFICE

HENRY EDWARDS, OF CAVERSHAM, READING, ORVILLE JOHN PARKER, OF EASTCHEAP, LONDON, AND ROBERT ARNOT, OF LONDON, ENGLAND, ASSIGNORS TO ANCOLEX LIMITED, OF LONDON, ENGLAND

PROCESS FOR THE CONVERSION OF METALLIC ORES

No Drawing. Application filed September 8, 1931, Serial No. 561,814, and in Great Britain September 13, 1930.

This invention relates to the heat treatment of ores involving partial or complete reduction to the metal or conversion of the ores into products of a lower molecular weight than the initial ore treated, the treatment being generally hereinafter referred to as conversion.

The invention more particularly relates to a process of the kind in which the pulverized or comminuted metallic ore is heated in admixture with pulverized carbonaceous material which includes oils, or oil bearing material under such conditions of temperature that no fusion of the reduction or conversion product takes place, the constituents of the treated ore being thus brought to a granular condition in which they may be subjected to the usual mechanical separation (for example, magnetic separation in the case of ores containing iron) and/or other separation methods.

With the process as hitherto employed it has been found that the reaction is considerably interfered with due to the moisture present in the ores or in the carbonaceous material or produced during the reaction, with the result that the reduction or conversion of the ores is retarded or does not take place to the desired extent.

The object of this invention is to remove the detrimental effects of moisture present by the employment of compounds which react with the moisture so as to either furnish products which assist in the conversion process or else form compounds with the water so that the water is bound and not released during the reaction.

The invention consists in a process for the treatment of ores in which the pulverized or comminuted ore or ores is or are heated in admixture with pulverized or comminuted carbonaceous material which includes oils and oil-bearing material under such conditions that the temperature is maintained below the temperature at which fusion of the reduction or conversion products might take place, the reaction being effected in the presence of water-decomposing materials.

Other features of the invention are hereinafter described and claimed in the appended claims.

As examples of water binding materials the following may be mentioned:

Alkaline earth metal (including magnesium) carbides, cyanamides particularly calcium cyanamide, nitrides, silicides, phosphides and even very hygroscopic salts, which will not release the moisture when the conversion is effected at below the temperature of dehydration of the hydrated salt.

The following is given as an example of the process according to the invention:

Examples

Tests were carried out with a goldbearing mispickel from the Socoro and Concordia mines of the Republic of Colombia which contains about 2 oz. of gold per ton of ore which carries about 3–4% of pyrites containing from 30–40% of iron and a certain percentage of arsenic. This was first ground to pass a sieve of about 20 mesh and was subjected to a wet separation process so as to eliminate as much of the gangue as possible and then the residue calcined in order to expel the volatile non-metallic constituents, i. e. sulphur and arsenic. 50 parts of this calcined ore were mixed with 15 parts of finely ground coal, which proportion was found to give good results and finally three parts of calcium carbide were added to the mixture in order to decompose the moisture present in the mixture. The whole was then heated in a retort to about 700–800° F. for a period of from 2–3 hours. The iron was separated by magnetic separation and the gold which was in a free state was recoverable by the usual amalgamation or concentration or any other known method.

The above example carried out with the auriferous pyrites from the above mentioned mines gave results showing a gold extraction of 94–95% by means of the process which included the carrying out of the preliminary roasting and concentration steps before the conversion.

In some cases it may be advisable or more advantageous to carry out the process in such manner that the ore is first subjected to the calcination and afterwards concentrated by any of the known processes. On occasion there may be an advantage or even a necessity to add salts such as sodium chloride as fluxing media to the mixture of the ores with the carbonaceous materials.

In some cases with certain ores it may be of advantage to increase the temperature but in no case is it extended to the fusion points of the metals contained in the ores. In other cases where, for instance, the ore contains tin or low melting metals it will be necessary to use an appropriate lower temperature than mentioned above.

The ores may be brought to the metallic state by the process, but it is to be understood that the process is not necessary extended to effect this, but the process may stop at an intermediate stage of reduction where the metal compounds are only partially reduced, but still ensuring by their state of sub-division their subsequent easy separation. For instance, the iron ores may be brought to the stage of oxides or suboxides.

Thus in this way, by the process according to the invention, products are obtained of a molecular weight, lower than the initial material.

The process has been found to be particularly useful for treating waste products, such as, for example, so-called burnt iron, (which results from the roasting of pyrites which may contain copper) or for treating other metal bearing waste compounds, such as waste lead peroxide and other lead oxides from lead manufactures, especially old accumulator plates, and lead sulphate from acid tanks and the like.

It is to be understood that the term ore hereinbefore used, is intended to cover either the ores as found naturally, or ores that have been submitted to a preliminary treatment such as roasting and/or concentration and is more particularly intended to include ores containing the carbonates, sulphides or oxides of, for instance, copper, silver, lead, iron, oxides of tin or similar metals.

The process is more especially although not necessarily applicable to the treatment of sulphide ores containing gold and other precious metals.

Having now described our invention, what we claim as new and desire to secure by Letters Patent is:—

1. The process of reducing metal bearing materials in which the charge contains water, consisting in heating the pulverized material admixed with sufficient carbonaceous material to effect the reduction thereof and an alkaline earth metal carbide sufficient to decompose the water present in the charge, maintaining the temperature below that at which fusion of the reduction product takes place until the desired reduction is completed, and separating the reduced metallic values from the product.

2. The process of reducing metal bearing materials in which the charge contains water, consisting in heating the pulverized material admixed with sufficient carbonaceous material to effect the reduction thereof and sufficient calcium carbide to decompose the water present in the charge, maintaining the temperature below that at which fusion of the reduction product takes place until the desired reduction is completed, and separating the reduced metallic values from the product.

3. Process of reducing goldbearing ores consisting in grinding and wet separating the ores to eliminate as much of the gangue as possible, calcining the residue to expel the volatile non-metallic constituents, i. e. sulphur and arsenic, mixing the calcined residue thus treated with sufficient carbonaceous material to effect reduction and sufficient calcium carbide to bind the water present in the carbonaceous material, heating the mixture to approximately 700°–800° F. to effect reduction without fusion, separating the reduced mixed metallic values from the product and separating the gold from the mixed metallic values.

In testimony whereof we have signed our names to this specification.

HENRY EDWARDS.
ORVILLE JOHN PARKER.
ROBERT ARNOT.